(12) United States Patent
Griggs

(10) Patent No.: US 11,832,605 B2
(45) Date of Patent: Dec. 5, 2023

(54) RODENT TRAP

(71) Applicant: Spectrum 3D, LLC, Madison, AL (US)

(72) Inventor: Lance Griggs, Madison, AL (US)

(73) Assignee: Spectrum 3D, LLC, Madison, AL (US)

( * ) Notice: Subject to any disclaimer, the term of this patent is extended or adjusted under 35 U.S.C. 154(b) by 28 days.

(21) Appl. No.: 17/012,878

(22) Filed: Sep. 4, 2020

(65) Prior Publication Data

US 2022/0071194 A1 Mar. 10, 2022

(51) Int. Cl.
*A01M 25/00* (2006.01)
*A01M 23/00* (2006.01)

(52) U.S. Cl.
CPC ........ *A01M 25/004* (2013.01); *A01M 23/005* (2013.01)

(58) Field of Classification Search
CPC .............. A01M 25/002; A01M 25/006; A01M 23/005; A01M 23/16; A01M 23/18; A01M 23/20; A01M 23/22; A01M 1/14; A01M 23/004
See application file for complete search history.

(56) References Cited

U.S. PATENT DOCUMENTS

| 3,816,956 A * | 6/1974 | Sekula ................. A01M 1/14 43/114 |
| 5,454,186 A * | 10/1995 | Gang .................... A01M 1/14 43/114 |
| 2004/0244274 A1* | 12/2004 | Dellevigne ........... A01M 25/00 43/131 |
| 2018/0077920 A1* | 3/2018 | Hertzler ................ A01M 27/00 |
| 2021/0015090 A1* | 1/2021 | Galloway ............. A01M 25/00 |

* cited by examiner

*Primary Examiner* — Joshua J Michener
*Assistant Examiner* — Henry Hooper Mudd
(74) *Attorney, Agent, or Firm* — Dennen IP Law, LLC

(57) ABSTRACT

A rodent trap for catching rodents having a housing and a top cover with a plurality of inside walls and at least one inside wall has a lateral tab protruding inward. The rodent trap also has a bottom base with a plurality of inside walls and at least one inside wall there is an opening that aligns with the at least one inside wall of the top cover that comprises the lateral tab. Further, the bottom base has a tunnel adjacent a poison cavity, and the tunnel has an opening configured for allowing the rodents to travel from the tunnel to the poison cavity. Also, the poison cavity has at least one structure for retaining poison for the rodent to eat the poison and die either in the housing or outside the housing.

21 Claims, 6 Drawing Sheets

RODENT TRAP

BACKGROUND

There are many different types of rodent traps capable of catching rodents, such as mice and rats. Oftentimes these rodent traps are designed to catch and kill the rodent. As a mere example, there is the spring-loaded bar trap. The spring-loaded bar trap has a spring-loaded arm that when activated by the rodent, releases a hammer, which kills the rodent.

There are electric rodent traps. An electric rodent trap has two electrodes located between the entrance and the bait. When the rodent enters the electric rodent trap, it completes the circuit and a lethal dose of electricity is delivered to the rodent.

There are also rodent traps designed for catch of the rodent and release. For example, there are tunnels that comprise a touch-sensitive lever on which bait is received. When the rodent reaches the bait, he stops on the touch-sensitive lever, and the lever activates thereby closing an opening through which the rodent traversed. There are many products on the market that may be used as catch and release traps.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure describes a rodent trap in accordance with an embodiment of the present disclosure. The rodent trap is a housing for killing rodents. In one embodiment, the housing is hexagonal. In this regard, the rodent trap comprises a hexagonal container comprising a top cover that fixedly and removably mounts to a bottom base. The bottom base comprises a covered pathway and a poison cavity. An inner opening separates the covered path from the poison cavity. When the top cover is mounted to the bottom base, the covered path is formed having an outside opening, one each side of the covered path. A rodent enters one of the outside openings and may traverse the rodent trap and exit the other outside opening. In the alternative, the rodent may enter one of the outside openings, enter the inner opening into the poison cavity that comprises poisonous bait. If the rodent eats the poisonous bait, the rodent dies either inside the hexagonal container, or he exits the hexagonal container and dies outside the hexagonal container. If the rodent dies within the hexagonal container, a service representative, a homeowner, or personnel at a business need only remove the top cover to retrieve the rodent from the hexagonal container.

Figure 1:
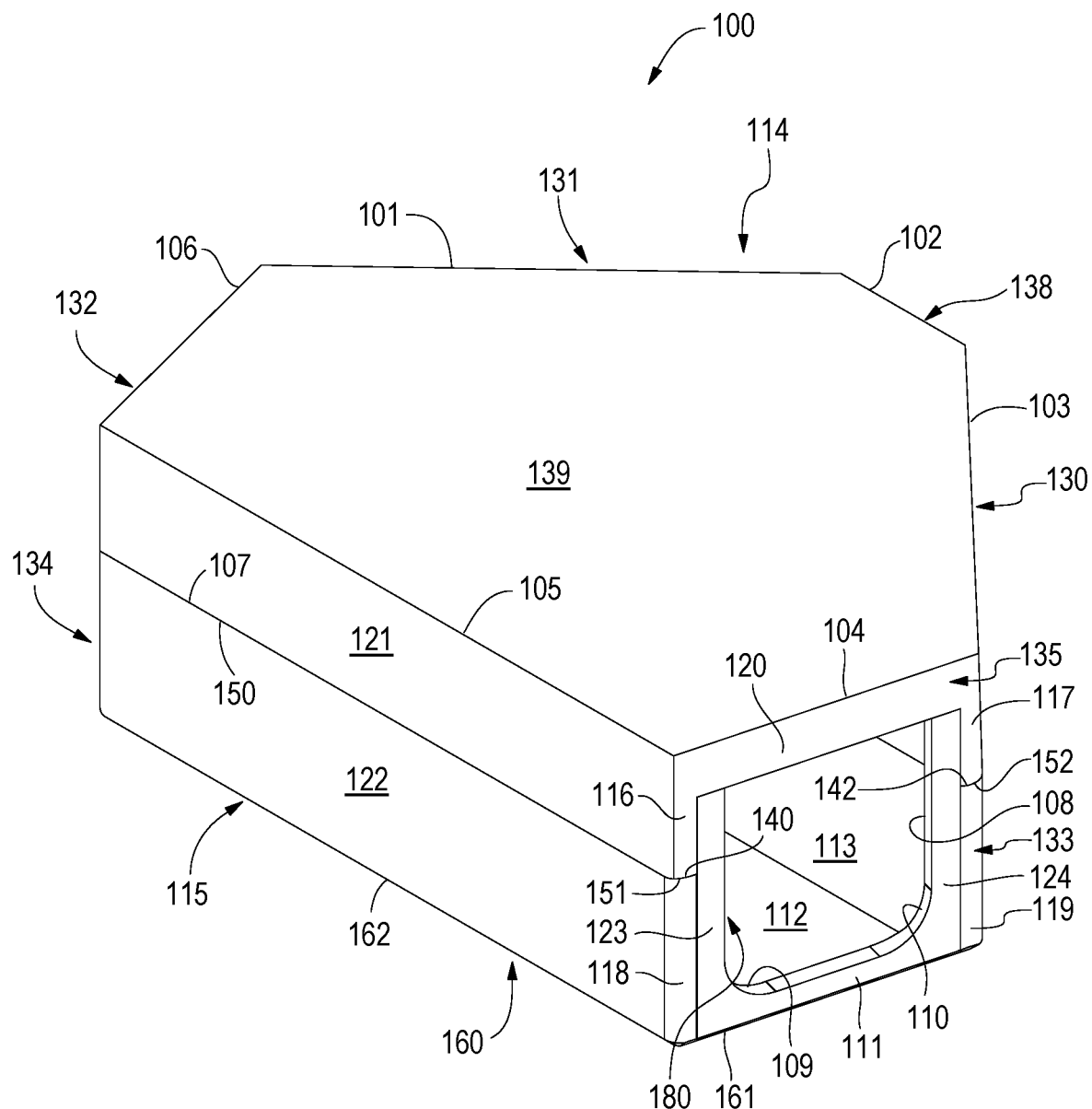
FIG. 1 is a front perspective view of a rodent trap in accordance with an embodiment of the present disclosure.

FIG. 1 is a front perspective view of a rodent trap 100 in accordance with an embodiment of the present disclosure. The rodent trap 100 comprises a top cover 114 and a bottom base 115. The top cover 114 is fixedly and removably coupled to the bottom base 115, which is described further herein.

The top cover 114 is a hexagonal prism and comprises a front face 121 and a side door face 135 contiguous with the front face 121. Note that the hexagonal shape is for exemplary purposes only and may be other shapes in other embodiments. On the side door face 135, the top cover 114 comprises a top door arch 120 having downwardly extending legs 116 and 117 that extend downwardly to the bottom base 115.

The top cover 114 further comprises a rear angled face 130 contiguous with the side door face 135, a rear straight face 138 that is contiguous with the rear angled face 130. The top cover 114 further comprises another rear angled face 131 that is contiguous with the rear straight face 138. The top cover 114 further comprises another side door face 132 that is contiguous with the other rear angled face 131 and the front face 121.

Each of the faces 121, 135, 130, 138, 131, and 132 comprises a top edge 105, 104, 103, 102, 101, and 106, respectively. The top edges 105, 104, 103, 102, 101, and 106 are contiguous with a top ceiling 139.

Further, the top cover 114 comprises a ledge that extends around the top cover 114 around the bottom perimeter of the top cover 114. At the ledge, the top cover 114 is separable from the bottom base 115. As an example, front face 121 has a ledge 107. At the ledge 107, the top cover 114 is separable from the bottom base 115.

Notably, the side door face 135 comprises ledges 140 and 142, and the top cover 114 is separable from the bottom base 115 at the ledges 140 and 142. Note that each face 121, 135, 130, 138, 131, and 132 comprise ledges (not shown), and the top cover 114 is separable from the bottom base at these ledges.

In this regard, the ledges are at the bottom portion of each of the faces 121, 135, 130, 138, 131, and 132. Thus, the top cover 114 is separable from the bottom base 115 at these ledges.

The side door face 135 comprises the door arch 120. The door arch 120 comprises the legs 116 and 117. The legs 116 and 117 comprise the ledges 140 and 142 that couple to the bottom base 115. The door arch 120 and the legs 116 and 117 form part of an opening 108 through which rodents may traverse. Note that door face 132 also comprises a door arch (not shown) and legs (not shown) that form part of an opening (not shown) on the door face 132, which is described further herein. Thus, a rodent (not shown) may enter the door 108 and travel through a tunnel (not shown) to the door (not shown) on the door face 132.

The bottom base 115 is a hexagonal prism and comprises a front face 122 a side door face 133 contiguous with the front face 122. Note that the hexagonal shape is for exemplary purposes only and may be other shapes in other embodiments. On the side door face 133, the bottom base 115 comprises a bottom door arch 111 having curved corners 109 and 110. The curved corners 109 and 110 are contiguous with two legs 123 and 124, and leg 123 and leg 124 extend upwardly toward the top cover 114 and form part of the opening 108 through which a rodent may traverse to enter the rodent trap 100.

The bottom base 115 further comprises a rear angled face (not shown) contiguous with the side door face 133, a rear straight face (not shown) that is contiguous with the rear angled face. The bottom base 115 further comprises another rear angled face (not shown) that is contiguous with the rear straight face. The bottom base 115 further comprises another side door face 134 that is contiguous with the other rear angled face and the front face 122. Thus, the bottom base faces form a hexagonal shape that mimics the shape of the top cover 114.

Note that the opening 108 is formed when the top cover 114 is fixedly and removably attached to the bottom base 115. When coupled together, the top door arch 135 and the legs 116 and 117 and the bottom door arch 111 and the legs 123 and 124 form and opening 108 to a tunnel 180 through which rodents may travel.

Each of the faces 122, 133, and those not shown comprises a bottom edge 162, 161, and not shown, respectively. The bottom edges 122, 133, and those not shown are contiguous with a bottom flooring 160.

The side door face 133 further comprises corner pieces 118 and 119 that curve around to their respective contiguous face. That is, corner 118 curves from the side door face 133 to the front face 122, and the corner 119 curves around to the angled rear face (not shown) of the bottom base 115.

Within the tunnel 180 is a path flooring 112. The path flooring 112 extends from opening 108 to the other opening (not shown) in the side door face 132. Further there is within the pathway inner walls. Inner wall 113 separates the tunnel 180 from a poison cavity (not shown). In the inner wall 113 is another opening (not shown) that leads to the poison cavity through which rodents may travel to enter in the poison cavity.

The face 122 there is a ledge 150, the ledge 150 is configured for receiving the ledge 107 when the top cover 114 is coupled to the bottom base 115. Further, the face 133 comprises ledges 151 and 152 for receiving the ledged 140 and 142 when the top cover 114 is coupled to the bottom base 115. Note that the ledges on the bottom base 115 extend around the perimeter of the bottom base 115 and the ledges on the top cover 114 extend around the perimeter of the top cover 114. Thus, the bottom ledges around the bottom base 115 are for receiving the top ledges around the top cover 114.

Figure 2A:
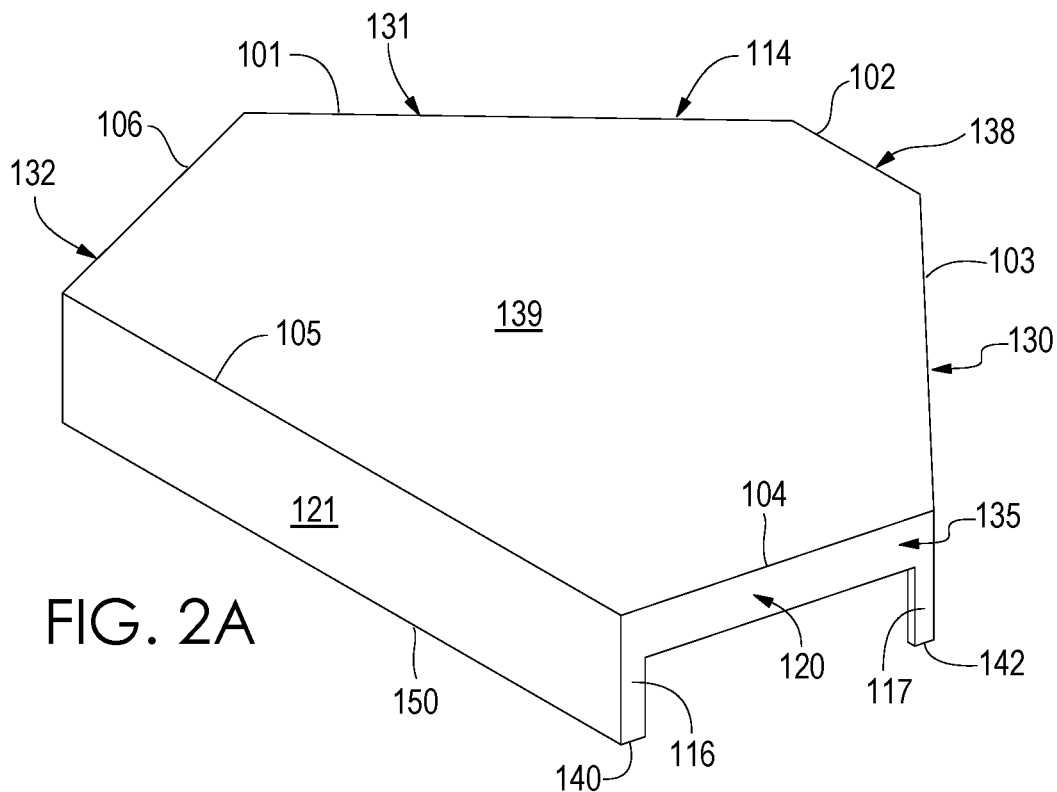
FIG. 2A is a front perspective view of a top cover of the rodent trap of FIG. 1.

FIG. 2A is a front perspective view of the top cover 114. The top cover 114 is hexagonal-shaped. Note that the hexagonal shape is merely exemplary, and the top cover 114 may be other shapes in other embodiments. The top cover 114 comprises a front face 121 and a side door face 135 contiguous with the front face 121. On the side door face 135, the top cover 114 comprises the top door arch 120 having the downwardly extending legs 116 and 117 that extend downwardly to the bottom base 115.

The top cover 114 further comprises a rear angled face 130 contiguous with the side door face 135 and a rear straight face 138. The top cover 114 further comprises another rear angled face 131 that is contiguous with the rear straight face 138. The top cover 114 further comprises another side door face 132 that is contiguous with the other rear angled face 131 and the front face 121.

Each of the faces 121, 135, 130, 138, 131, and 132 comprises a top edge 105, 104, 103, 102, 101, and 106, respectively. The top edges 105, 104, 103, 102, 101, and 106 are contiguous with a top ceiling 139.

The top cover 114 further comprises a ledge 107 on the bottom of face 121 that is received by the ledge 150 (FIG. 1) when the top cover 114 is inserted on the bottom cover 115. Further, ledges 140 and 142 are received by ledges 151 and 152 when the top cover 114 is inserted on the bottom cover 115. Note that the top cover 114 has ledges around the bottom perimeter of the faces 121, 135, 130, 138, 131, and 132 of the top cover 114 and the top perimeter of the faces 122 (FIG. 1), 133 (FIG. 1), 130 (FIG. 1), 138 (FIG. 1), 131 (FIG. 1), and 132 (FIG. 1) of the bottom base 115 have ledges that couple to the ledges of top cover 114.

Figure 2B:
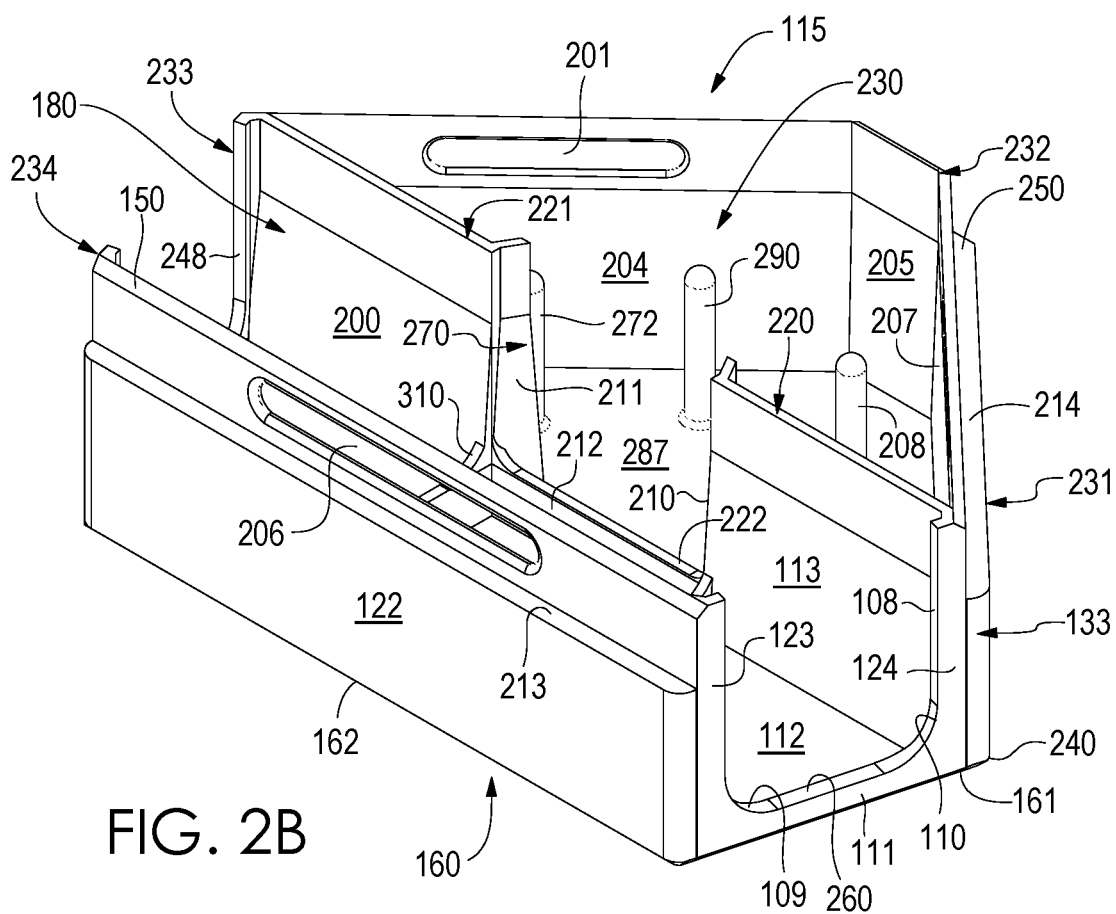
FIG. 2B is front perspective view of a bottom base of the rodent trap of FIG. 1 that receives the cover shown in FIG. 2.

FIG. 2B shows the bottom base 115 removed from the top cover 114 (FIG. 2A). Note that during operation, the top cover 114 is fixedly and removably coupled to the bottom base 115. Thus, a user may remove the top cover 114 from the bottom base 115 to retrieve rodents from a poison cavity 230.

The bottom base 115 is hexagonally-shaped and comprises a front face 122 a side door face 133 contiguous with the front face 122. Note that the hexagonal shape is merely exemplary, and the bottom base 115 may be other shapes in other embodiments. On the side door face 133, the bottom base 115 comprises a bottom door arch 111 having curved corners 109 and 110. The curved corners 109 and 110 are contiguous with the two legs 123 and 124, and 123 and 123 extend upwardly toward the top cover 114 and form part of the opening 108 through which a rodent may travel.

The bottom base 115 further comprises a rear angled face 231 contiguous with the side door face 133, a rear straight face 232 that is contiguous with the rear angled face 231. The bottom base 115 further comprises another rear angled face 233 that is contiguous with the rear straight face 232. The bottom base 115 further comprises another side door face 234 that is contiguous with the other rear angled face 233 and the front face 122.

Note that the opening 108 is formed when the top cover 114 is fixedly and removably attached to the bottom base 115. When coupled together, the top door arch 120 (FIG. 2A) and the legs 116 (FIG. 2A) and 117 (FIG. 2A) and the bottom door arch 111, and the legs 123 and 124 form the opening 108 to the tunnel 180 through which rodents may travel.

Each of the faces 122, 133, 231, 232, 233, and 234 comprises a bottom edge 162, 161, 240, respectively while the other bottom edges are not shown in FIG. 2B. The bottom edges 162, 161, and 240 and those not shown are contiguous with a bottom flooring 160.

Further, the bottom base 115 comprises a ledge 213 on front face 122, a ledge 214 on rear angled face 231, and a ledge 250 on rear straight face 232. A ledge (not shown) also traverses the rear angled face 233. The ledges 213, 214, 250, and the ledge on rear angled face 233 receives the edges 162 (FIG. 1), 161 (FIG. 1), and those edges not shown.

Note that the bottom base 115 comprises the tunnel 180 and the poison cavity 230. Inner walls 200 and 113 separate the poison cavity 230 from the tunnel 180. When the top cover 114 is fixedly and removably coupled to the bottom base 115, the tunnel 180 and the poison cavity 230 are covered and separated. The tunnel comprises a tunnel flooring 112 and the bottom base comprises an inner flooring 27.

In this regard, the bottom base 115 comprises an oval-shaped opening 206 in an upper portion of front face 122. Further, the bottom base 115 comprises an oval-shaped opening 201 in an upper portion of rear angled face 233 and an oval-shaped opening (not shown) in an upper portion of rear angled face 231. The oval-shaped openings 206, 201, and oval-shaped opening (not shown) receive rectangular-shaped tabs (not shown) on an inside front wall and on inside rear angled walls of the top cover 114. The openings 206, 201, and oval-shaped opening (now shown) couple the top cover 114 to the bottom base 115. Note that the oval-shaped openings can be other shapes in other embodiments.

The bottom base 115 comprises the opening 108 and an opening 248 that are coupled via a path flooring 112. There is a protruding ledge 260 at the bottom of the opening 108 and a protruding ledge (not shown) at the bottom of the opening 248. The protruding ledge 260 and the protruding ledge (not shown) serve to keep rodents from entering then exiting the rodent trap 100.

Within the tunnel 180 on the path flooring 112 are two additional barriers, including flooring arch 310 and a flooring arch 222. These arches 310 and 222 server to keep rodents that enter the tunnel 180 in a direction toward the poison cavity 230. Further, the bottom base 115 comprises an opening 270 that leads from the tunnel 180 to the poison cavity 230. The opening 270 comprises two side legs 211 and 210 that extend from a protruding floor archway 212.

The poison cavity 230 comprises front walls 220 and 221 that are separated by the opening 270. The poison cavity 230 comprises a rear angled wall 204 contiguous with front wall 221, a rear straight wall 205 that is contiguous with the rear angled wall 204, and another rear angled wall 207 that is contiguous the front wall 220. The walls 220, 221, 204, 205, and 207 form the poison cavity 230 in which rodents may enter.

Notably, bait is placed on a plurality of poles 272, 290 and 208 that are mounted to the poison cavity flooring 287. Note that there are four poles in the present embodiment, but one of the poles is not shown in FIG. 2B. Also, while four poles are shown in the present embodiment fewer or more poles may be used in other embodiments. The rodent senses the bait via smell and enters the poison cavity 230 where the rodent eats the bait. The rodent may die in the poison cavity or the rodent may leave the rodent trap and commence to die outside the rodent trap.

Figure 3A:
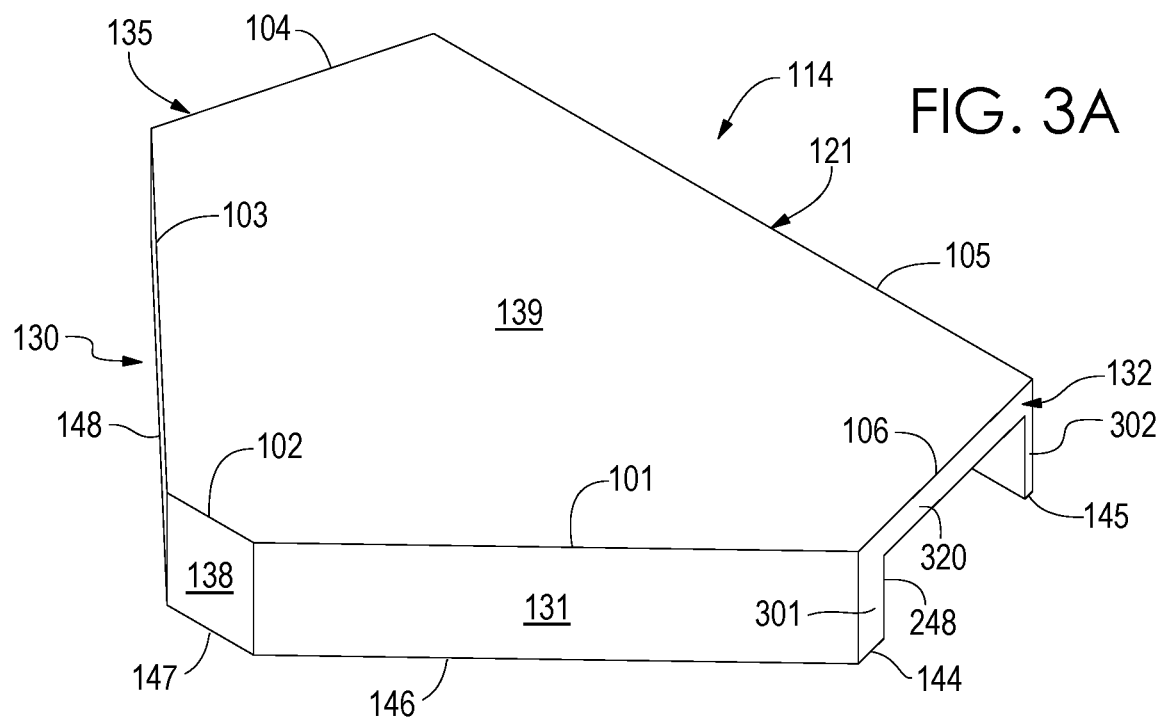
FIG. 3A is a side perspective view of the top cover shown in FIG. 2A.

FIG. 3A is a side perspective view of the top cover 114. The top cover 114 is hexagonal-shaped. Note that the hexagonal shape is merely exemplary, and the top cover 114 may be other shapes in other embodiments. The top cover 114 comprises a front face 121 and a side door face 135 contiguous with the front face 121 and another side door face 132 contiguous with the front face 121. On the side door face 132, the top cover 114 comprises the top door arch 320 having the downwardly extending legs 301 and 302 that extend downwardly to the bottom base 115.

The top cover 114 further comprises a rear angled face 130 contiguous with the side door face 135 (FIG. 2A) and a rear straight face 138 that is contiguous with the rear angled face 130. The top cover 114 further comprises another rear angled face 131 that is contiguous with the rear straight face 138. The top cover 114 further comprises another side door face 132 that is contiguous with the other rear angled face 131 and the front face 121.

Each of the faces 121, 135, 130, 138, 131, and 132 comprises the top edge 105, 104, 103, 102, 101, and 106, respectively. The top edges 105, 104, 103, 102, 101, and 106 are contiguous with the top ceiling 139.

Figure 3B:
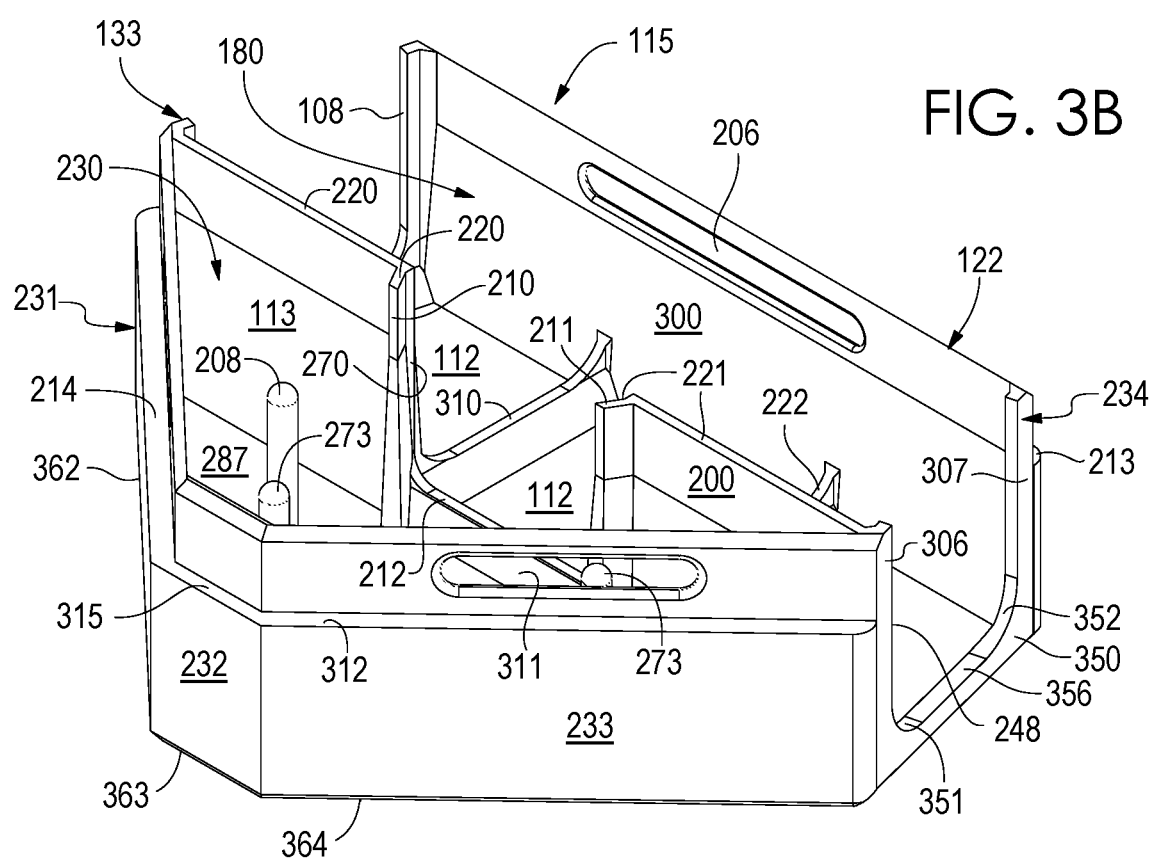
FIG. 3B is a side perspective view of the bottom base shown in FIG. 2B.

FIG. 3B shows the bottom base 115 removed from the top cover 114 (FIG. 2A). Note that during operation, the top cover 114 is fixedly and removably coupled to the bottom base 115. Thus, a user may remove the top cover 114 from the bottom base 115 to retrieve rodents from a poison cavity 230.

The side door face 132 comprises an arch 320. Extending downwardly on either side of the arch 320 are legs 301 and 302. The arch 320 and the legs 301 and 302 for a portion of the opening 248 through which rodents may travel.

The bottom base 115 is hexagonally-shaped and comprises a front face 122 a side door face 133 contiguous with the front face 122. Note that the hexagonal shape is merely exemplary, and the top cover 114 may be other shapes in other embodiments. On the side door face 234, the bottom base 115 comprises a bottom door arch 350 having curved corners 351 and 352. The curved corners 351 and 352 are contiguous with two legs 306 and 307, and legs 306 and 307 extend upwardly toward the top cover 114 and form part of the opening 248 through which a rodent may travel when entering the rodent trap 100.

The bottom base 115 further comprises a rear angled face 231 contiguous with the side door face 133 and a rear straight face 232 that is contiguous with the rear angled face 231. The bottom base 115 further comprises another rear angled face 233 that is contiguous with the rear straight face 232. The bottom base 115 further comprises another side door face 234 that is contiguous with the other rear angled face 233 and the front face 122.

Note that the opening 248 is formed when the top cover 114 is fixedly and removably attached to the bottom base 115. When coupled together, the bottom door arch 350 and the legs 351 and 352 and the legs 306 and 309 form and opening 108 to a tunnel 180 through which rodents may traverse when entering the rodent trap. The tunnel is formed by walls 113 and 200 and opposing wall 300.

Each of the faces 122, 133, 231, 232, 233, and 234 comprises a bottom edge 162 (FIG. 2B), 161 (FIG. 2B), 362, 363, 364, and 233, respectively. The bottom edges 162 (FIG. 2B), 161 (FIG. 2B), 362, 363, 364, and 233, respectively are contiguous with a bottom flooring 160 (FIG. 2B).

Further, the bottom base 115 comprises a ledge 213 (FIG. 2B) on front face 122, a ledge 214 (FIG. 2B) on rear angled face 231, and a ledge 315 (FIG. 2B) on rear straight face 232. A ledge 312 also traverses the rear angled face 233. The ledges 213, 214, 315, and 312 receive the edges 162 (FIG. 1), 161 (FIG. 1), and those edges not shown.

Note that the bottom base 115 comprises the tunnel 180 and the poison cavity 230. Inner walls 200 and 113 separate the poison cavity 230 from the tunnel 180 and between inner walls 200 and 113 is the opening 270. When the top cover 114 is placed fixedly and removably coupled to the bottom base 115, the tunnel 180 and the poison cavity 230 are covered and separated. The tunnel has a flooring 112, and the bottom base has a poison cavity flooring 287.

In this regard, the bottom base 115 comprises an oval-shaped opening 206 in an upper portion of front face 122. Further, the bottom base 115 comprises an oval-shaped opening 311 in an upper portion of rear angled face 233 and an oval-shaped opening 201 (FIG. 2B) in an upper portion of rear angled face 231. The oval-shaped openings 206, 311, and 201 receive oval-shaped tabs (not shown) on an inside front wall and on inside rear angled walls of the top cover 114. The openings 206, 201, and 311 couple the top cover 114 to the bottom base 115.

The bottom base 115 comprises the opening 108 and the opening 248 that are coupled via a path flooring 112. There is a protruding ledge 356 at the bottom of the opening 248 and a protruding ledge 260 (FIG. 2B) at the bottom of the opening 108. The protruding ledge 356 and the protruding ledge 260 serve to keep rodents from entering then exiting the rodent trap 100.

Within the tunnel 180 on the path flooring are two additional barriers, including flooring arch 310 and a flooring arch 222. These arches 310 and 222 server to keep rodents that enter the tunnel 180 in a direction toward the poison cavity 230. Further, the bottom base 115 comprises an opening 270 that leads from the tunnel 180 to the poison cavity 230. The opening 270 comprises two side legs 211 and 210 that extend from a protruding floor archway 212.

The poison cavity 230 comprises front inner walls 113 and 200 that are separated by the opening 270. The poison cavity 230 comprises a rear angled wall 204 (FIG. 2B) contiguous with angled inner wall 113, a rear straight wall 205 (FIG. 2B) that is contiguous with the angled rear inner wall 204, another rear angled wall 207 (FIG. 2B) that is contiguous the rear straight wall 205. The walls 200, 113, 204, 205, and 207 form the poison cavity 230 in which rodents enter.

Notably, bait is placed on a plurality of poles 272, 290 (FIG. 2B), 208 and 273, which are mounted to the poison cavity flooring 287. The rodent senses the bait via smell and enters the poison cavity 230 where the rodent eats the bait. The rodent may die in the poison cavity or the rodent may leave the rodent trap and commence to die outside the rodent trap.

The poison cavity 230 comprises walls 220 and 221 that are separated by the opening 270. The poison cavity 230 comprises a rear angled wall 204 (FIG. 2B) contiguous with front wall 221, a rear straight wall 205 (FIG. 2B) that is contiguous with the rear angled wall 204, and another rear angled wall 207 (FIG. 2B) that is contiguous with the front wall 220. The walls 220, 221, 204, 205, and 207 form the poison cavity 230 in which rodents may enter.

In addition, the bottom base 215 comprises ledges around the bottom base 214. In this regard, angled face 233 comprises a ledge 312, straight read face 232 comprises a ledge 315, angled face 213 comprises a ledge 214, and front face 122 (FIG. 2B) comprises front ledge 213 (FIG. 2B).

Figure 4:
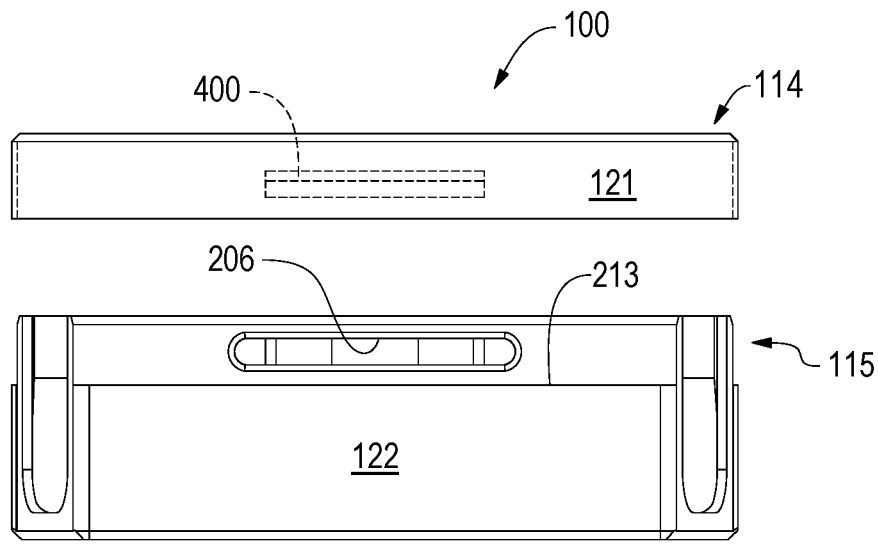
FIG. 4 is an exploded rear side plan view of the rodent trap of FIG. 1.

FIG. 4 is an exploded front plan view of the rodent trap 100. The rodent trap 100 comprises the top cover 114 and the bottom base 115. The top cover 114 couples to the bottom base 115 during use, which creates a tunnel 180 (FIG. 3B) and a poison cavity 230 (FIG. 3B) within the rodent trap 100.

The top cover 114 comprises a substantially rectangular tab 400 on front face 121. Further, the bottom base 115 comprises a substantially oval-shaped opening 206 on face 122. The oval-shaped opening 206 is above the ledge 213 on which the top cover 114 rests when the rodent trap 100 is assembled. In operation, a user (not shown) sets the top cover 114 on the bottom base 115 and snaps the substantially rectangular tab 400 into the substantially oval-shaped opening 206, which fixedly and removably couples the top cover 114 to the bottom base 115.

Figure 5:
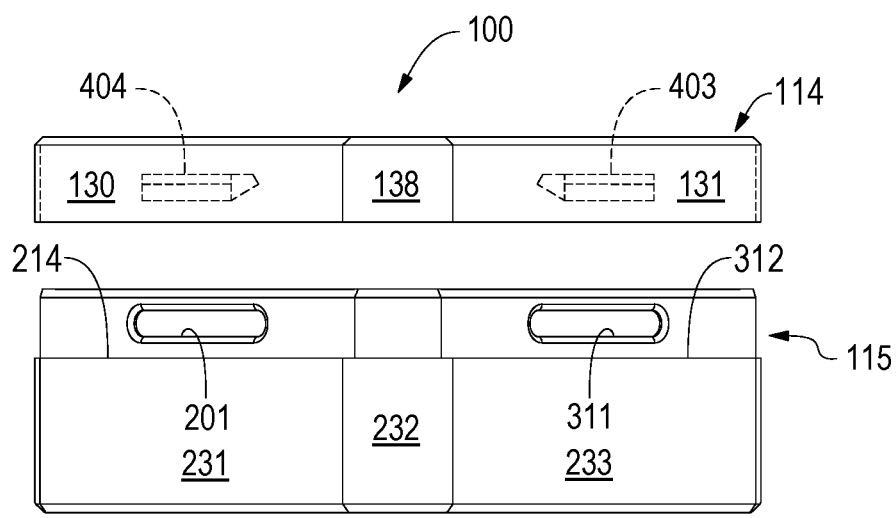
FIG. 5 is another exploded front side plan view of the rodent trap of FIG. 1

FIG. 5 is an exploded rear plan view of the rodent trap 100. The rodent trap 100 comprises the top cover 114 and the bottom base 115. The top cover 114 couples to the bottom base 115 during use, which creates a tunnel 180 (FIG. 3B) and a poison cavity 230 (FIG. 3B) within the rodent trap 100.

The top cover 114 comprises the straight back face 138, and angling back from the straight back face 138, is the angled face 131 and the angled face 130. The angled face 131 comprises a substantially rectangular tab 403 on angled face 131. Further, the angled face 130 comprises a substantially rectangular tab 404 on angled face 130.

Additionally, the bottom base 115 comprises a substantially oval-shaped opening 311 on angled face 233, and a substantially oval-shaped opening 201 on angled face 231. The substantially oval-shaped opening 311 and substantially oval-shaped opening 201 are above the ledges 312 and 214, respectively, on which the top cover 114 rests when the rodent trap 100 is assembled. In operation, a user sets the top cover 114 on the bottom base 115 and snaps the substantially rectangular protrusion 403 into the substantially oval-shaped opening 311 and snaps the substantially rectangular protrusion 404 in the substantially oval-shaped opening 201, which fixedly and removably couples the top cover 114 to the bottom base 115.

Figure 6:
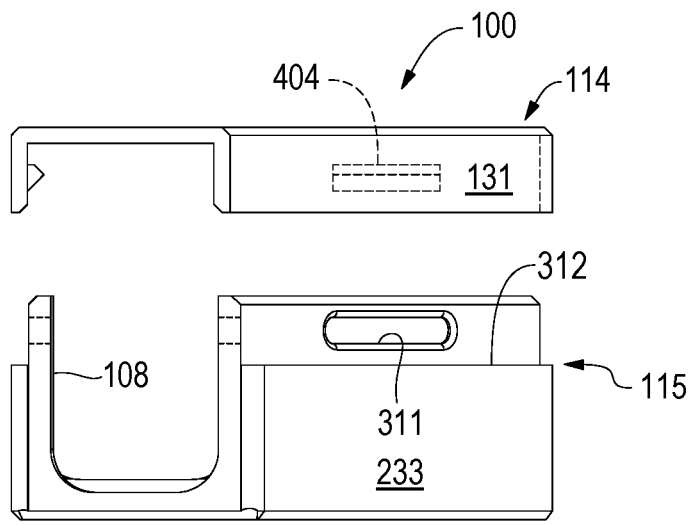
FIG. 6 is an exploded door side plan view of the rodent trap of FIG. 1.

FIG. 6 is a side plan view of the rodent trap 100. The rodent trap 100 comprises the top cover 114 and the bottom base 115. The top cover 114 couples to the bottom base 115 during use, which creates a tunnel 180 (FIG. 3B) and a poison cavity 230 (FIG. 3B) within the rodent trap 100.

The top cover 114 comprises the angled face 131 that angles back from the door 108. The angled face 131 comprises the substantially rectangular protrusion 404 on angled face 131.

Additionally, the bottom base 115 comprises a substantially oval-shaped opening 311 on angled face 233. The substantially oval-shaped opening 311 is above the ledge 312, on which the top cover 114 rests when the rodent trap 100 is assembled. In operation, a user sets the top cover 114 on the bottom base 115 and snaps the substantially rectangular protrusion 404 into the substantially oval-shaped opening 311, which fixedly and removably couples the top cover 114 to the bottom base 115.

Figure 7:
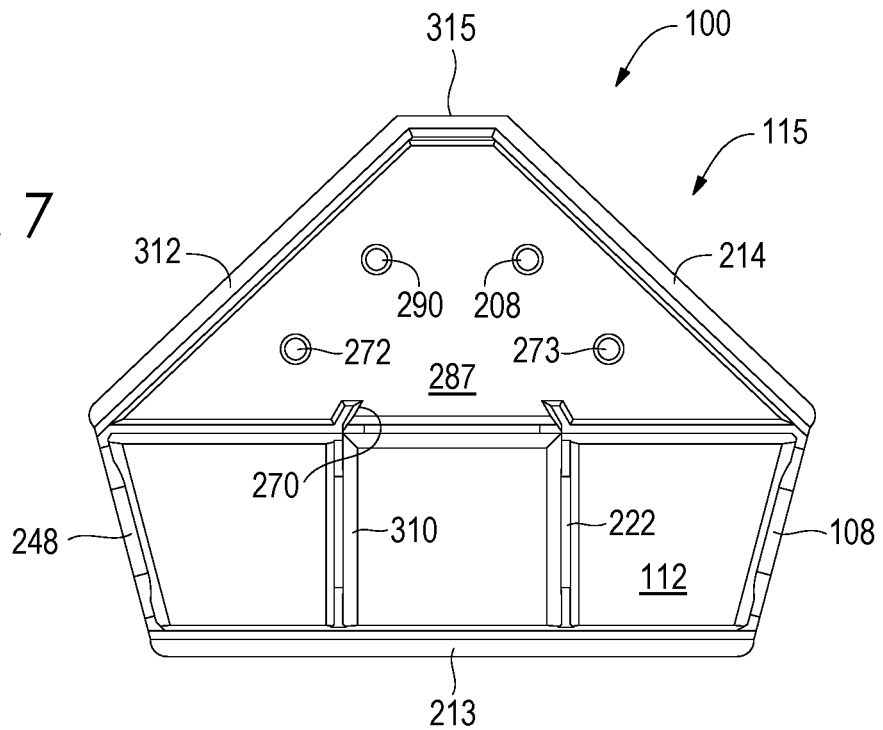
FIG. 7 is a top view of the bottom base shown in FIG. 2B.

FIG. 7 is a top view of the bottom base 115. Notably, the bottom base 115 comprises the ledges 312, 315, 214, and 213. The ledges 312, 315, 214, and 213 receive the corresponding ledges of the top cover 114. The bottom base 115 comprises the openings 108 and opposing opening 248 through which rodents can enter the rodent trap 100 (FIG. 1). Midway between opening 108 and opening 248 is an opening 270 that leads to the poison cavity 230. A rodent merely walks through one of the openings 108 and 248 and travel along tunnel flooring 112. The rodent may enter the opening 270 and enter the poison cavity 230.

The poison (not shown) is within the poison cavity 230. In this regard, poisonous material in brick-like form is placed on the poles 272, 290, 208, and 272. Other types of poison may be used in other embodiments.

In use, a rodent enters opening 108 or 248. The rodent travels to the opening 270 and enters. The rodent partakes in the brick-like poison (not shown). The rodent may die in the rodent trap 100, or the rodent may exit the rodent trap 100 and die outside the rodent trap 100.

Figure 8:
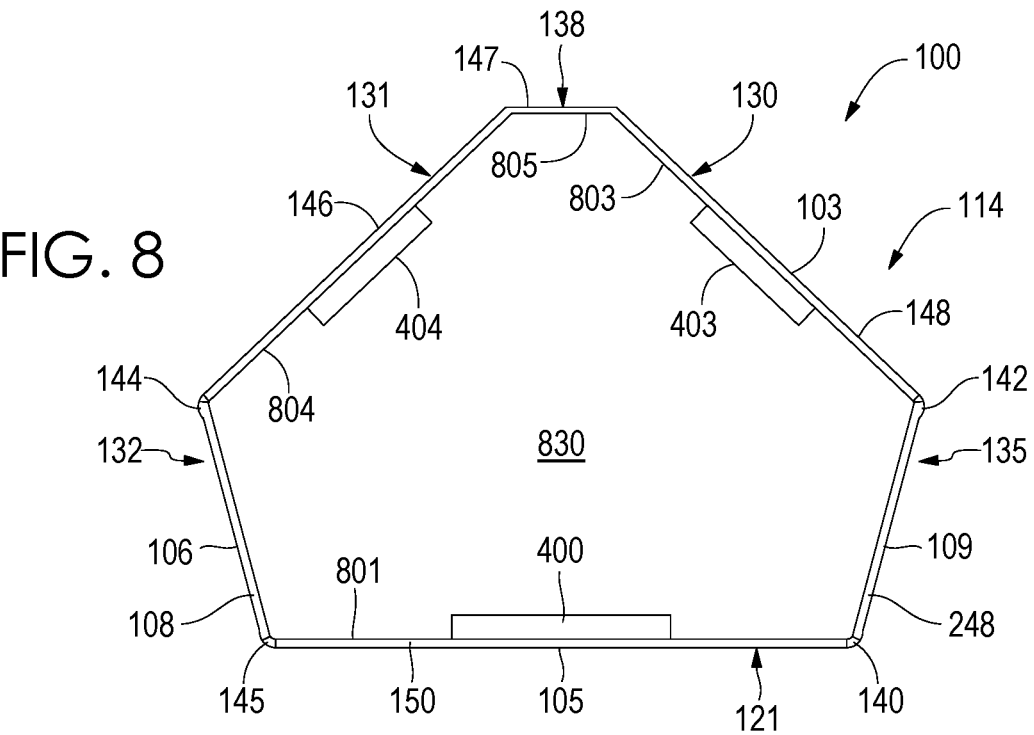
FIG. 8 is a top view of the top cover shown in FIG. 2A.

FIG. 8 is a top view of the top cover 114. The top cover 114 is hexagonally-shaped and has an inner upper ceiling 830. Circumscribing the top cover 114 are ledges 150, 140, 142, 148, 147, 146, 144, and 145 around the hexagonally-shaped top cover 114, except where there are openings 108 and 248. The ledges 150, 142, 148, 147, 146, 144, and 145 rest on the ledges 213 (FIG. 7), 312 (FIG. 7), 315 (FIG. 7), and 214 (FIG. 7) of the bottom base 115 (FIG. 7).

The top cover 114 further comprises the plurality of tabs 400, 403, and 404. The tab 400 is placed on an inner front wall 801. Tab 403 is placed on an angled inner wall 803, and tab 404 is placed on an angled inner wall 804 opposing angled inner wall 803.

Further, the top cover 114 comprises an inner ceiling 830 contiguous with inner walls 801, 804, 805, and 803. There are openings 108 and 248 on faces 132 and 135. Further, the faces 130, 138, 131, 132, and 121 surround the top inside portion of the rodent trap 100.

In operation, the top cover 114 is placed on top of the bottom base 115 so that the ledge 800 rests on the ledges 312, 315, 214, and 213. The tab 400 is snapped into the substantially oval-shaped opening 206 (FIG. 2B). The tab 403 is snapped into the substantially oval-shaped opening 311 (FIG. 3B), and tab 404 is snapped into the substantially oval-shaped opening 201 (FIG. 2B). The snapping of the tabs 400, 403, and 404 into the openings 206, 311, and 201, respectively secures the top cover 114 to the bottom base 115.

Figure 9:
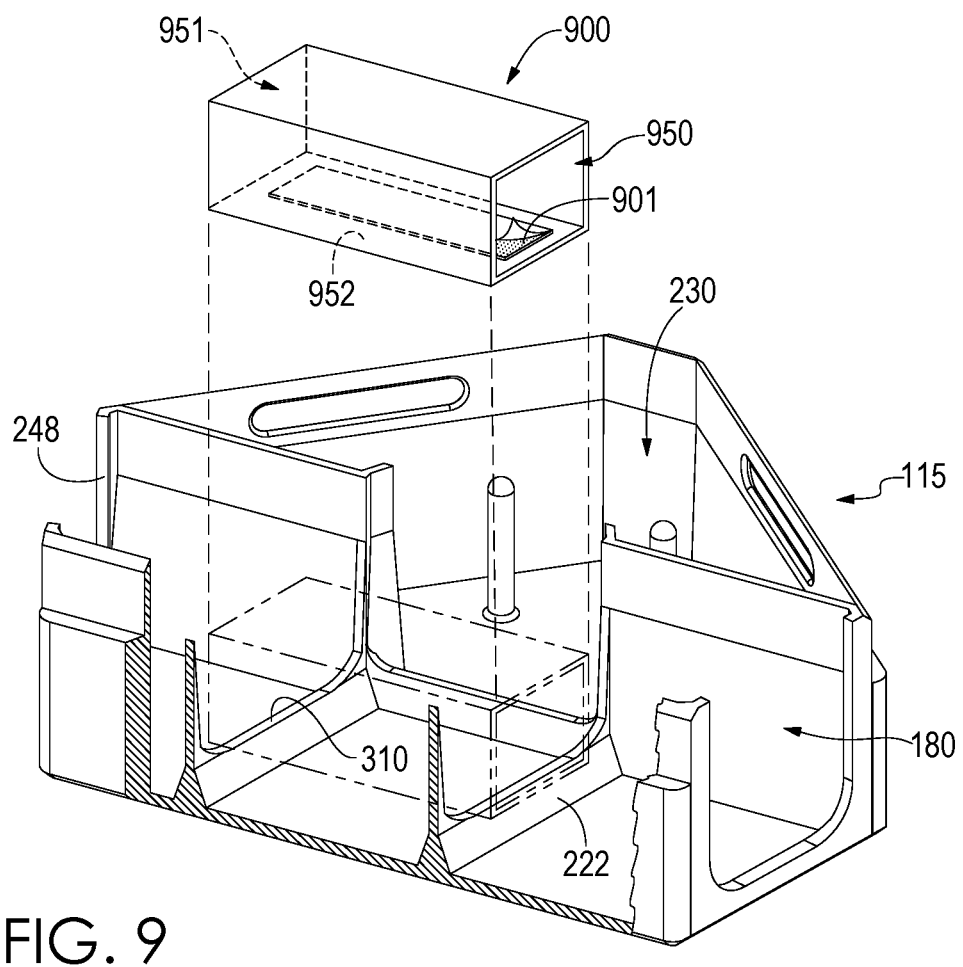
FIG. 9 is an exploded view showing the bottom base of FIG. 2B and a tube that fits within a tunnel of the bottom base.

FIG. 9 is a cut-away view of the bottom base 115. In one embodiment, a substantially rectangular box 900 comprising a sticky substance 901 on a box floor 952 is placed within the bottom base 115. The box 900 comprises openings 950 and 951 for ingress and egress of a rodent (not shown).

In use, the substantially rectangular box 900 is placed atop flooring arches 310 and 222 in the tunnel 180. In this regard, the box 900 sits on the arches 310 and 222, and rodents enter through opening 180 or opening 248 in the rodent trap 100 (FIG. 1). The rodents enter the box 900 through openings 950 and 951. When entering the openings 950 and 951, the rodent(s) becomes stuck to the sticky paper 901 on the floor 952 of the box 900.

Indeed, a rodent may be enticed to enter the rodent trap 100 (FIG. 1) through the opening 108 or opening 248. When the rodent enters the substantially rectangular box 900, the rodent's feet and other parts of the rodent's body become stuck to the sticky substance 901. A user may then remove the rodent from the rodent trap 100.

Figure 10:
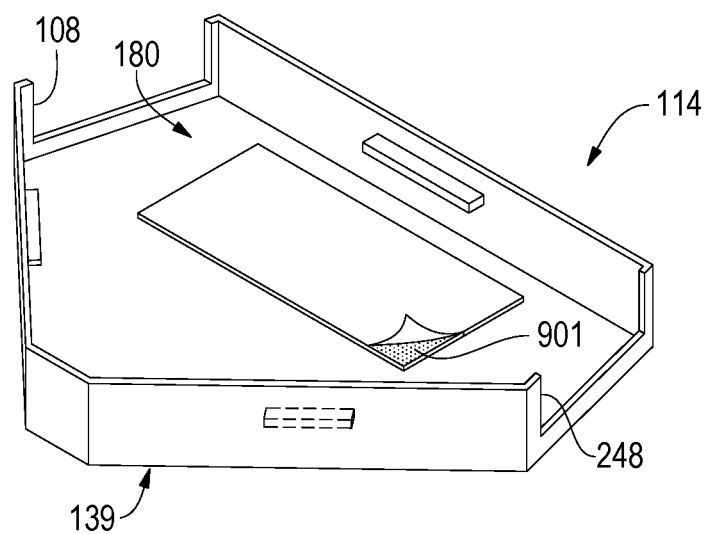
FIG. 10 is a top inside view of the top cover shown in FIG. 2A.

FIG. 10 is another embodiment of a rodent trap in accordance with the present disclosure. In such an embodiment, the rodent trap 100 is flipped upside down. Thus, the ceiling 139 of the top cover 114 rests on the ground. The sticky paper 901 is coupled to the tunnel-portion of the rodent trap 100.

In use, a rodent(s) (not shown) may enter one of the openings 108 and 248. The rodent travels from one opening, e.g., 108, to the other opening 248. As the rodent travels across the sticky paper 901, he becomes caught. A user of the rodent trap 100 may ten decouple the bottom base 115 from the top cover 114 and retrieve the rodent. In such an embodiment, catch and release is possible.

What is claimed is:

1. A rodent trap for catching rodents, comprising:
 a housing comprising:
 a top cover, the top cover having a plurality of inside walls and at least one inside wall comprises an elongated lateral tab that protrudes outwardly from the at least one inside wall;
 a bottom base, the bottom base comprising a plurality of inside walls and at least one inside wall comprises an elongated lateral through opening formed in an exterior wall of said bottom base, the elongated lateral through opening aligns with the at least one inside wall of the top cover that comprises the elongated lateral tab, such that the elongated lateral tab fits within the elongated lateral through opening to secure the top cover to the bottom base, the bottom base further comprising a tunnel adjacent a poison cavity, the tunnel comprising an opening configured for allowing the rodents to travel from the tunnel to the poison cavity, the poison cavity comprising at least one structure for retaining poison and configured for the rodent to eat the poison and die either in the housing or outside the housing.

2. The rodent trap for catching rodents of claim 1, wherein the housing is hexagonal.

3. The rodent trap for catching rodents of claim 2, wherein the top cover comprises a top cover front face contiguous with a first and second top cover door faces, and each of the first and second top cover door face is contiguous with a first and second top cover angled face, respectively, and the first and second top cover angled faces are contiguous with a short rear face.

4. The rodent trap for catching rodents of claim 3, wherein the bottom base comprises a bottom base front face contiguous with a first and second bottom base door face, and the first and second bottom base door faces are contiguous with a first and second bottom base angled face, respectively, and the first and second bottom base angled faces are contiguous with a short rear face.

5. The rodent trap for catching rodents of claim 4, wherein the top cover and bottom base front faces align, the top cover and bottom base door faces align, the top cover and bottom base angled faces align, and the top cover and the bottom base short rear faces align.

6. The rodent trap for catching rodents of claim 4, wherein when the top cover is fixedly and removably coupled to the bottom base.

7. The rodent trap for catching rodents of claim 1, wherein when the top cover is fixedly and removably coupled to the bottom base, the housing comprises the tunnel.

8. The rodent trap for catching rodents of claim 7, wherein the tunnel comprises at least two doors, the first door comprising the first top cover door face coupled to the bottom cover door face and the second door comprising the second top cover door face is coupled to the bottom cover door face.

9. The rodent trap for catching rodents of claim 7, wherein when the top cover is fixedly and removably coupled to the bottom base, the housing comprises the poison cavity.

10. The rodent trap for catching rodents of claim 9, wherein the poison cavity comprises at least one pole configured for holding bait.

11. The rodent trap for catching rodents of claim 1, further comprising a box open on a first end and a second end, the box comprising a floor and coupled to the floor is sticky glue tape for catching rodents for release, the box is inserted on a floor of the tunnel.

12. The rodent trap for catching rodents of claim 1, further comprising sticky glue tape that is coupled to a ceiling of the top cover such that when the rodent trap is turned upside down, rodents traveling on the sticky glue tape are incapacitated so that the rodents can be caught and released.

13. The rodent trap for catching rodents of claim 1, wherein only a single wall separated by the opening separates the tunnel from the poison cavity.

14. The rodent trap for catching rodents of claim 1, further comprising a first opening to the tunnel, the opening comprising a top section and a bottom section.

15. The rodent trap for catching rodents of claim 14, wherein the opening comprises an arched top section have legs extending therefrom to a ledge of the bottom base.

16. The rodent trap for catching rodents of claim 15, further comprising a bottom door arch.

17. The rodent trap for catching rodents of claim 16, wherein the bottom door arch comprises legs that extend upward on either side of the opening to the arched top section.

18. The rodent trap for catching rodents of claim 17, wherein when the top cover is attached to the bottom base a door is formed through which rodents enter.

19. The rodent trap for catching rodents of claim 1, wherein the bottom base comprises a ledge that is formed around the periphery of the bottom base of the rodent trap.

20. The rodent trap for catching rodents of claim 19, wherein the top cover comprises an indentation that is formed around the periphery of the top cover of the rodent trap.

21. The rodent trap for catching rodents of claim 20, wherein when the top cover is attached to the bottom base the indentation is situated atop the ledge.

\* \* \* \* \*